H. A. GELSINGER.
FISHING APPARATUS.
APPLICATION FILED JULY 30, 1909.
967,897.
Patented Aug. 23, 1910.
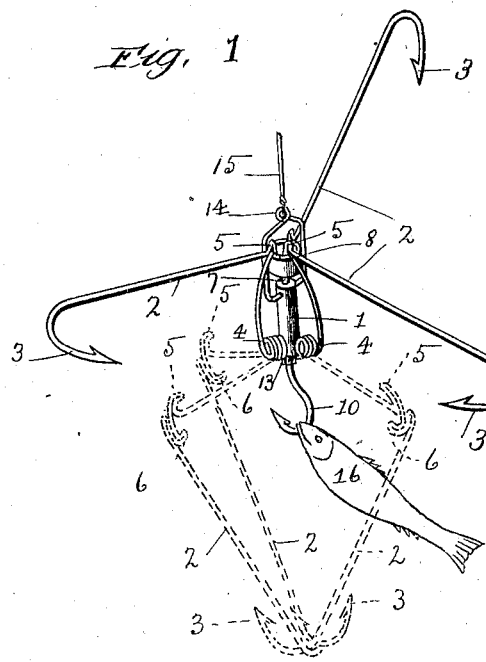
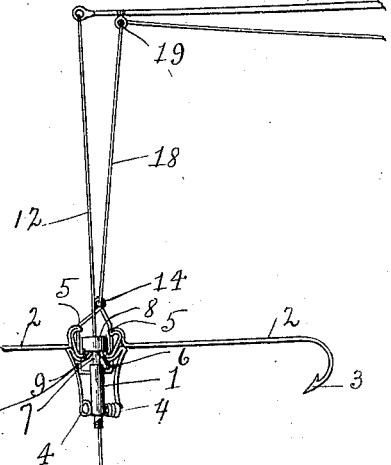
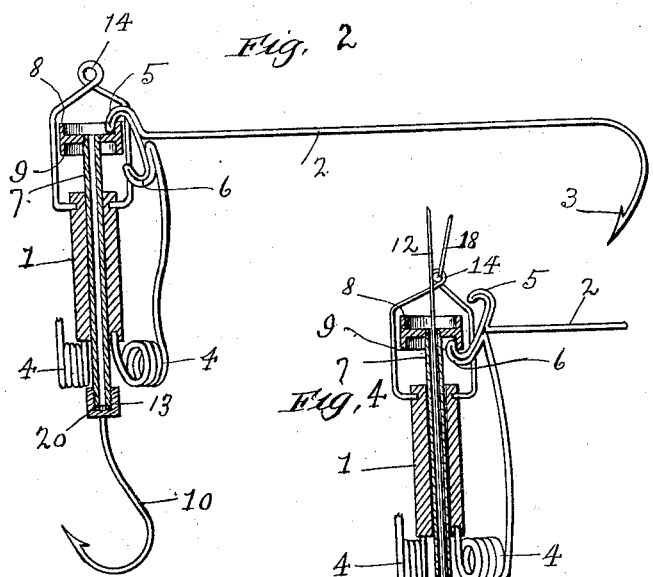
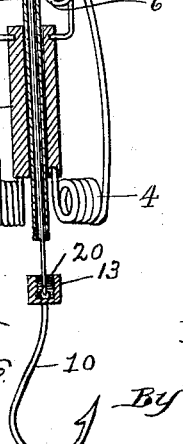
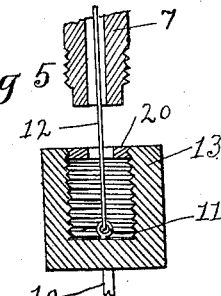
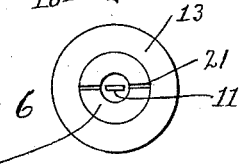
Witnesses:
Inventor:
Henry A. Gelsinger
By Cyrus W. Rice
Atty.

UNITED STATES PATENT OFFICE.

HENRY A. GELSINGER, OF CHICAGO, ILLINOIS.

FISHING APPARATUS.

967,897.  Specification of Letters Patent.  Patented Aug. 23, 1910.

Application filed July 30, 1909. Serial No. 510,395.

*To all whom it may concern:*

Be it known that I, HENRY A. GELSINGER, a citizen of the United States, resident of the city of Chicago, in the county of Cook and State of Illinois, have invented certain new and useful Improvements in Fishing Apparatus, of which the following is a specification.

My invention relates to fishing apparatus and its object is to provide such an apparatus that will prevent a fish having taken the bait from escaping. This object is attained by, and my invention is embodied in, the following described mechanism, illustrated by the accompanying drawings, in which:—

Figure 1 shows my device in its first adaptation; Fig. 2 is a longitudinal section of parts of the same; Fig. 3 shows my apparatus in its second adaptation; Fig. 4 is a longitudinal section of parts of the same; Fig. 5 is an enlarged longitudinal section of certain parts of my apparatus; and Fig. 6 is a plan view of the internally threaded collar on the fish hook's shank with its internal nut.

On the lower end of a hollow cylindrical body 1 are mounted a suitable number—preferably three as shown—of radial arms 2 terminating in impaling hooks 3. These are spring-pressed downward, or convergently, as by the coiled springs 4 formed integral therewith. Suitable catches 5 formed on the arms serve to "set" them in the adaptation of my device illustrated in Figs. 1 and 2; and like catches 6 serve to "set" the arms in the other adaptation shown in Figs. 3 and 4, all as hereinafter explained. A hollow plunger 7 adapted to move a short distance longitudinally in the hollow body 1, is provided at its upper end with an upwardly extending annular rib or catch 8 adapted to engage and hold the catches 5, and also with a similar downwardly extending rib or catch 9 adapted to engage and hold the catches 6, in order to "set" the device in one or the other of its adaptations. A suitable fish hook 10 is provided at the upper end of its shank with suitable means for attaching it to the lower end of the plunger 7, as the internally threaded nut 13 into which may be turned the threaded lower end of the plunger, as shown.

My apparatus is adapted to be used in two ways: First, in the adaptation shown in Figs. 1 and 2 the device is suspended as by the pivoted eye 14 on the fish-line 15. The fish hook 10 is screwed on the lower end of the plunger 7 and a bait 16 is attached. The arms 2 are forced upwardly by hand against the pressure of their springs 4 and are "set" by raising the plunger sufficiently to cause its upper rib 8 to engage and hold the catches 5. It will be seen that when a fish pulls the bait the plunger will be drawn downwardly thus releasing the catches, and the arms 2 will descend convergently by the action of their springs and secure the fish on their impaling hooks 3. Secondly, in the adaptation shown in Figs. 3 and 4, the fish hook 10 is detached from the plunger 7 and is attached to the fish line 12 as by the eye 11, the line 12 passing through the hollow plunger. The body 1 with connected parts is suspended near the fish rod 17 as by a cord 18 attached to the pivoted eye 14, thence running through an eye 19 and passing back into the control of the fisher. The arms 2 are "set" by lowering the plunger sufficiently to cause its lower rib 9 to engage and hold the catches 6. It will be seen that when a fish takes the hook 10, the fisher may by releasing the cord 18 allow the body 1 and its connected parts to fall: when in so doing, the lower end of the plunger strikes the nut 20, the device is "tipped" by the force of the fall, the plunger moving upwardly sufficiently to release the catches 6, and the arms descending secure the fish on their impaling hooks 3. The nut 20 having the kerf 21 being turned up to the position shown in Fig. 5, the threads of the collar 13 are protected from injury from the striking of the extremity of the plunger; and when the apparatus is used in the adaptation shown in Figs. 1 and 2, the nut 20 is screwed down sufficiently to admit the threaded end of the plunger.

Not confining myself to the details of construction shown and described, further than as pointed out in the claims, I claim:

1. In a device of the character described, the combination with a fish hook and line, of a body adapted to travel along the line suspended above the fish-hook and releasable from such suspension by the fisherman and having impaling hooks, and means for setting and means for tripping the impaling hooks.

2. In a device of the character described, the combination with a fish hook and line, of a body adapted to travel along the line suspended above the fish-hook and releasable from such suspension by the fisherman and having spring-pressed impaling hooks, means for setting the impaling hooks, and means intermediate the fish hook and said setting means to trip the impaling hooks.

3. In a device of the character described, the combination with a fish hook and line, of a body adapted to travel along the line suspended above the fish-hook and releasable from such suspension by the fisherman and having spring-pressed impaling hooks, a plunger slidable on the body and adapted to engage the impaling hooks to set the same, and a striker intermediate the point of the fish hook and the plunger adapted to strike and move the plunger to trip the impaling hooks.

4. A device of the character described, comprising a fish hook and line attachable thereto in the second adaptation of the device, a body having spring-pressed impaling hooks and adapted to be attached to the line in the device's first adaptation and to travel along the line in its second adaptation, a plunger slidable on the body and adapted to engage and release the impaling hooks and attachable to the fish hook in said first adaptation, and a striker intermediate the point of the fish hook and the plunger adapted to strike and move the plunger to release the impaling hooks and arrest the downward travel of the body in the device's second adaptation.

5. A device of the character described, comprising a fish hook and line attachable thereto in the second adaptation of the device, a hollow body having spring-pressed impaling hooks with upwardly and downwardly extending catches, said body being adapted to be attached to the line in the device's first adaptation and to travel along the line in its second adaptation, a plunger slidable in the hollow body and provided with downwardly and upwardly extending catches adapted to engage respectively the upwardly and downwardly extending catches of the impaling hooks to set the same, the plunger having an opening through which the line is adapted to pass in said second adaptation, said plunger being attachable to the fish hook in the first adaptation, and a striker intermediate the point of the fish hook and the plunger adapted to strike and move the plunger to trip the impaling hooks and arrest the downward travel of the body in the second adaptation.

6. In a device of the character described, the combination of a hollow body having spring-pressed impaling hooks, a plunger slidable in the hollow body, adapted to set and trip the impaling hooks, and screw threaded at its lower end, a fish hook provided at its shank end with a screw threaded collar adapted to be turned on the plunger and containing an internal nut, substantially as described and for the purpose set forth.

In witness whereof, I have signed my name to this specification in the presence of two subscribing witnesses.

HENRY A. GELSINGER.

Witnesses:
  NELLIE F. MURPHY,
  STEPHEN A. CROSS.